US 8,286,439 B2

(12) United States Patent
Wu et al.

(10) Patent No.: US 8,286,439 B2
(45) Date of Patent: Oct. 16, 2012

(54) VARIABLE SPEED DRIVE FOR PERMANENT MAGNET MOTOR

(75) Inventors: Zhiqiao Wu, York, PA (US); Ivan Jadric, York, PA (US); Michael S. Todd, Jacobus, PA (US); Justin Drew Warner, Harrisburg, PA (US); Shreesha Adiga Manoor, York, PA (US); Konstantin Borisov, York, PA (US); Scott Victor Slothower, Dillsburg, PA (US); Kanishk Dubey, York, PA (US); John C. Hansen, Spring Grove, PA (US)

(73) Assignee: Johnson Control Technology Company, Holland, MI (US)

( * ) Notice: Subject to any disclaimer, the term of this patent is extended or adjusted under 35 U.S.C. 154(b) by 522 days.

(21) Appl. No.: 12/572,883

(22) Filed: Oct. 2, 2009

(65) Prior Publication Data
US 2010/0083692 A1 Apr. 8, 2010

Related U.S. Application Data

(60) Provisional application No. 61/102,687, filed on Oct. 3, 2008.

(51) Int. Cl.
*F25B 49/00* (2006.01)
(52) U.S. Cl. ..................... 62/228.1; 62/228.4
(58) Field of Classification Search .................. 62/228.1, 62/228.4, 229, 230, 498; 700/276; 318/700, 318/801, 808
See application file for complete search history.

(56) References Cited

U.S. PATENT DOCUMENTS 3,593,103 A 7/1971 Chandler et al.
3,621,366 A 11/1971 Duff et al.
(Continued)

FOREIGN PATENT DOCUMENTS
EP 0272776 A2 6/1988
(Continued)

OTHER PUBLICATIONS

Silicon Carbide npnp Thyristors, John H. Glenn Research Center, Cleveland, Ohio, downloaded from http://www.nasatech.com/Briefs/Dec00/LEW16750.html on Jan. 20, 2004, 3 pages.

(Continued)

*Primary Examiner* — Mohammad Ali
(74) *Attorney, Agent, or Firm* — McNees Wallace & Nurick LLC (57) ABSTRACT

A drive system for a compressor of a chiller system includes a variable speed drive. The variable speed drive is arranged to receive an input AC power at a fixed AC input voltage and fixed input frequency and provide an output AC power at a variable voltage and variable frequency. The variable speed drive includes a converter connected to an AC power source providing the input AC voltage. The converter is arranged to convert the input AC voltage to a DC voltage. A DC link is connected to the converter. The DC link is arranged to filter and store the DC voltage from the converter. A first inverter and a second inverter are each connected to the DC link. A motor includes stator windings connected between the first inverter and the second inverter to power the motor by the output AC power from the first inverter and the second inverter. The motor is connectable to a compressor of the chiller system to power the compressor. The motor may be a permanent magnet synchronous motor.

20 Claims, 6 Drawing Sheets

U.S. PATENT DOCUMENTS

| | | | |
|---|---|---|---|
| 4,308,491 | A | 12/1981 | Joyner, Jr. et al. |
| 4,587,474 | A | 5/1986 | Espelage et al. |
| 4,697,131 | A | 9/1987 | Schauder et al. |
| 4,758,771 | A | 7/1988 | Saito et al. |
| 4,761,726 | A | 8/1988 | Brown |
| 4,864,483 | A | 9/1989 | Divan |
| 4,959,602 | A | 9/1990 | Scott et al. |
| 5,038,267 | A | 8/1991 | De Donker et al. |
| 5,081,368 | A | 1/1992 | West |
| 5,123,080 | A | 6/1992 | Gillett et al. |
| 5,127,085 | A | 6/1992 | Becker et al. |
| 5,298,848 | A | 3/1994 | Ueda et al. |
| 5,410,230 | A | 4/1995 | Bessler et al. |
| 5,483,142 | A | 1/1996 | Skibinski et al. |
| 5,499,178 | A | 3/1996 | Mohan et al. |
| 5,570,279 | A | 10/1996 | Venkataramanan |
| 5,592,058 | A | 1/1997 | Archer et al. |
| 5,625,549 | A | 4/1997 | Horvat |
| 5,646,458 | A | 7/1997 | Bowyer et al. |
| 5,747,955 | A | 5/1998 | Rotunda et al. |
| 5,757,599 | A | 5/1998 | Crane |
| 5,796,234 | A | 8/1998 | Vrionis |
| 5,869,946 | A | 2/1999 | Carobolante |
| 5,889,667 | A | 3/1999 | Bernet |
| 5,909,637 | A | 6/1999 | Charneski et al. |
| 5,936,855 | A | 8/1999 | Salmon |
| 5,969,966 | A | 10/1999 | Sawa et al. |
| 6,005,362 | A | 12/1999 | Enjeti et al. |
| 6,050,083 | A | 4/2000 | Meckler |
| 6,072,302 | A | 6/2000 | Underwood et al. |
| 6,118,676 | A | 9/2000 | Divan et al. |
| 6,160,722 | A | 12/2000 | Thommes et al. |
| 6,163,472 | A | 12/2000 | Colby |
| 6,239,513 | B1 | 5/2001 | Dean et al. |
| 6,242,884 | B1 * | 6/2001 | Lipo et al. .................. 318/808 |
| 6,276,148 | B1 | 8/2001 | Shaw |
| 6,313,600 | B1 | 11/2001 | Hammond et al. |
| 6,348,775 | B1 | 2/2002 | Edelson et al. |
| 6,407,937 | B2 | 6/2002 | Bruckmann et al. |
| 6,487,096 | B1 | 11/2002 | Gilbreth et al. |
| 6,507,503 | B2 | 1/2003 | Norrga |
| 6,559,562 | B1 | 5/2003 | Rostron |
| 6,566,764 | B2 | 5/2003 | Rebsdorf et al. |
| 6,603,675 | B1 | 8/2003 | Norrga |
| 6,625,046 | B2 | 9/2003 | Geissler |
| 6,657,874 | B2 | 12/2003 | Yu |
| 6,658,870 | B1 | 12/2003 | Jenkins |
| 6,686,718 | B2 | 2/2004 | Jadric et al. |
| 6,704,182 | B2 | 3/2004 | Bruckmann et al. |
| 6,768,284 | B2 | 7/2004 | Lee et al. |
| 6,801,019 | B2 | 10/2004 | Haydock et al. |
| 6,971,482 | B2 * | 12/2005 | Takeda ........................ 187/313 |
| 7,005,829 | B2 | 2/2006 | Schnetzka |
| 7,009,856 | B2 * | 3/2006 | Moon et al. .................. 363/37 |
| 7,081,734 | B1 | 7/2006 | Jadric et al. |
| 7,116,066 | B2 | 10/2006 | Lin |
| 7,135,828 | B2 | 11/2006 | Lin |
| 7,154,237 | B2 * | 12/2006 | Welchko et al. ......... 318/400.27 |
| 7,164,242 | B2 * | 1/2007 | Federman et al. ........ 318/400.21 |
| 7,408,312 | B2 | 8/2008 | Itou et al. |
| 7,411,329 | B2 | 8/2008 | Murakami et al. |
| 7,425,806 | B2 * | 9/2008 | Schnetzka et al. .............. 318/41 |
| 7,555,912 | B2 | 7/2009 | Schnetzka et al. |
| 2002/0176261 | A1 | 11/2002 | Norrga |
| 2003/0015873 | A1 | 1/2003 | Khalizadeh et al. |
| 2003/0052544 | A1 | 3/2003 | Yamamoto et al. |
| 2003/0133317 | A1 | 7/2003 | Norrga |
| 2003/0168919 | A1 | 9/2003 | Friedrichs et al. |
| 2003/0231518 | A1 | 12/2003 | Peng |
| 2004/0008005 | A1 | 1/2004 | Sakai et al. |
| 2004/0012986 | A1 | 1/2004 | Riggio et al. |
| 2005/0057210 | A1 | 3/2005 | Ueda et al. |
| 2005/0068001 | A1 | 3/2005 | Skaug et al. |
| 2005/0190511 | A1 | 9/2005 | Crane et al. |
| 2005/0225270 | A1 * | 10/2005 | Schnetzka et al. .............. 318/66 |
| 2006/0208685 | A1 | 9/2006 | Schnetzka |
| 2007/0032909 | A1 * | 2/2007 | Tolbert et al. ................ 700/276 |
| 2007/0063668 | A1 | 3/2007 | Schnetzka et al. |

FOREIGN PATENT DOCUMENTS

| | | |
|---|---|---|
| EP | 0283954 A2 | 9/1988 |
| EP | 0422221 A1 | 11/1989 |
| EP | 1300937 A2 | 4/2003 |
| EP | 031336 A2 | 8/2008 |
| JP | 6105563 | 9/1992 |
| JP | 5068376 | 3/1993 |
| JP | 2002176767 | 6/2002 |
| JP | 4026374 | 9/2006 |
| WO | 9314559 A1 | 7/1993 |
| WO | 9732168 A1 | 9/1997 |
| WO | 2004098038 A1 | 11/2004 |

OTHER PUBLICATIONS

IGBT with Reverse Blocking Capability, IXYS Semiconductor GmbH, 2003, pp. 1-2.

Ahmed Elasser and T. Paul Chow, Silicon Carbide Benefits and Advantages for Power Electronics Circuits and Systems, Proceedings of the IEEE, vol. 90, No. 6, Jun. 2002, pp. 969-986.

M. Takei, T. Naito and K. Ueno, The Reverse Blocking IGBT for Matrix Converter with Ultra-Thin Wafer Technology, 4 pages.

Klumpner C. et al; "Using Reverse Blocking IGBTs in Power Converters for Adjustable Speed Drives", Conference Record of the 2003 IEEE Industry applications Conference 38th IAS Annual Meeting, Salt Lake City, UT, Oct. 12-16, 2003, vol. 3 of 3 Conf. 38, pp. 1516-1523 USA.

Ozipineci B. et al.: "4H-SiC GTO Thyristor and p-n Diode Loss Models for HVDC Converter", Industry Applications Conference 2004, 39th IAS Annual Meeting, conference record of the 2004 IEEE Seattle, WA USA, Oct. 2004, vol. 2, pp. 1238-1243.

Jue Wang et al.: "Evaluation of High-Voltage 4H-SiC Switching Devices" IEEE Transactions on Electron Devices, IEEE Service Center, Piscataway, NJ, vol. 46, No. 3, Mar. 1999.

Annabelle Van Zyl, Rene Spee, Alex Faveluke, and Shibashis Bhowmik; Voltange Sag Ride-Through for Adjustable-Speed Drives With Active Rectifiers; Nov./Dec. 1998; vol. 34, Issue No. 6; IEEE Transactions on Industry Applications.

Annette Von Jouanne, Prasad N. Enjeti, and Basudeb Banerjee; Assessment of Ride-Through Alternatives for Adjustable-Speed Drives; Jul./Aug. 1999; vol. 35, Issue No. 4; IEEE Transactions on Industry Applications.

Morimoto et al., "Expansion of Operating Limits for Permanent Magnet Motor by Current Vector Control Considering Inverter Capacity", IEEE Transactions on Industry Applications, vol. 26, Issue No. 5, Sep./Oct. 1990.

Libor Prokop and Pavel Grasblum, "3-Phase PM Synchronous Motor Vector Control Using a 56F80x, 56F8100, or 56F8300 Device", Freescale Semiconductor: Application Note, AN1931, Rev. 3 Jan. 2005.

* cited by examiner

VARIABLE SPEED DRIVE FOR PERMANENT MAGNET MOTOR

CROSS-REFERENCE TO RELATED APPLICATIONS

This patent application claims the benefit of U.S. Provisional Patent Application No. 61/102,687, filed Oct. 3, 2008, entitled PERMANENT MAGNET MOTOR DRIVE AND CONTROLLER, for which priority is claimed and the disclosure of which is hereby incorporated by reference.

BACKGROUND

The application generally relates to a permanent magnet motor drive. The application relates more specifically to a variable speed drive (VSD) for controlling a permanent magnet motor that powers a compressor in heating, ventilation, air conditioning and refrigeration (HVAC&R) systems.

Currently VSDs are used to power a variety of motor types in HVAC&R systems. Common types of motors that are used for HVAC&R applications include induction motors, switched reluctance motors, and other synchronous and DC motors capable of handling the torque and speed ranges in such HVAC&R systems.

Permanent magnet synchronous motors (PMSM) are of particular interest for use as traction motors in electric vehicle designs due to their higher efficiency and higher power density as compared to regular DC motors and AC induction motors. PMSM motors typically operate with a permanent magnet rotor. A permanent magnet rotor may be configured with surface mounted permanent magnets or with interior permanent magnets having different arrangements. The PMSM is a rotating electric machine in which the stator might be similar to a stator of an induction motor and the rotor has surface-mounted or interior permanent magnets. However, a totally different stator design for a PMSM is possible and a stator design optimization is necessary even though the stator topology might be similar to an induction machine. The use of a permanent magnet to generate a substantial air gap magnetic flux makes it possible to design highly efficient PMSMs.

A PMSM that is driven by a sinusoidal current is referred to as a PMSM while, a PMSM that is driven by a rectangular 120° electrical phase-current waveform is can be referred to as a brushless dc (BLDC) machine. The rotor structure of the PMSM and BLDC might be the same such as surface-mounted permanent magnet rotor. Both the PMSM and BLDC are driven by currents coupled with the given rotor position. The angle between the generated stator flux linkage and the rotor flux linkage, which is generated by a rotor magnet, defines the torque, and thus speed, of the motor. Both the magnitude of the stator flux linkage and the angle between the stator flux linkage and rotor flux linkage are controllable to maximize the torque or minimize the losses. To maximize the performance of PMSM and ensure the system stability, the motor requires a power electronics converter for proper operation.

For a three-phase PMSM, a standard three-phase power output stage is used, which is the same power stage that is used for AC induction motors. The power stage utilizes six power transistors with independent switching. The power transistors are switched in the complementary mode. The fundamental sine wave output is generated using a PWM technique.

Heretofore PMSM motors and their associated VSDs have been limited in their application in commercial and industrial scale HVAC&R systems, largely due to factors relating to relatively low performance requirements from old HVAC&R systems, higher system cost, and complicated control system design.

SUMMARY

The present invention relates to a drive system for a compressor of a chiller system including a variable speed drive. The variable speed drive is arranged to receive an input AC voltage at a fixed AC input frequency and provide an output AC power at a variable voltage and variable frequency, the variable speed drive includes a converter connected to an AC power source providing the input AC voltage. The converter is arranged to convert the input AC voltage to a DC voltage. A DC link is connected to the converter. The DC link is arranged to filter and store the DC voltage from the converter. A first inverter and a second inverter are each connected to the DC link. A motor includes stator windings connected between the first inverter and the second inverter to power the motor by the output AC power from the first inverter and the second inverter. The motor is connectable to a compressor of the chiller system to power the compressor. The motor may be a permanent magnet synchronous motor.

The present invention also relates to a chiller system includes a compressor, a condenser, and an evaporator connected in a closed refrigerant loop. A motor is connected to the compressor to power the compressor. A variable speed drive is connected to the motor. The variable speed drive is arranged to receive an input AC power at a fixed input AC voltage and a fixed input frequency and provide an output power at a variable voltage and variable frequency to the motor. The variable voltage has a maximum voltage greater in magnitude than the fixed input AC voltage and the variable frequency having a maximum frequency greater than the fixed input frequency. The variable speed drive includes a converter connected to an AC power source providing the input AC voltage. The converter is arranged to convert the input AC voltage to a DC voltage. A DC link is connected to the converter. The DC link is arranged to filter and store the DC voltage from the converter. A first inverter and a second inverter are connected to the DC link. The motor includes stator windings connected between an output of the first inverter and an output of the second inverter. Each of the stator windings has a first terminal and a second terminal. The stator winding first terminal is connected to the first inverter and the stator winding second terminal is connected to the second inverter. The variable speed drive powers the motor by the output AC power from the first inverter and the second inverter. The motor may be a permanent magnet synchronous motor.

DETAILED DESCRIPTION OF THE EXEMPLARY EMBODIMENTS

Figure 1:
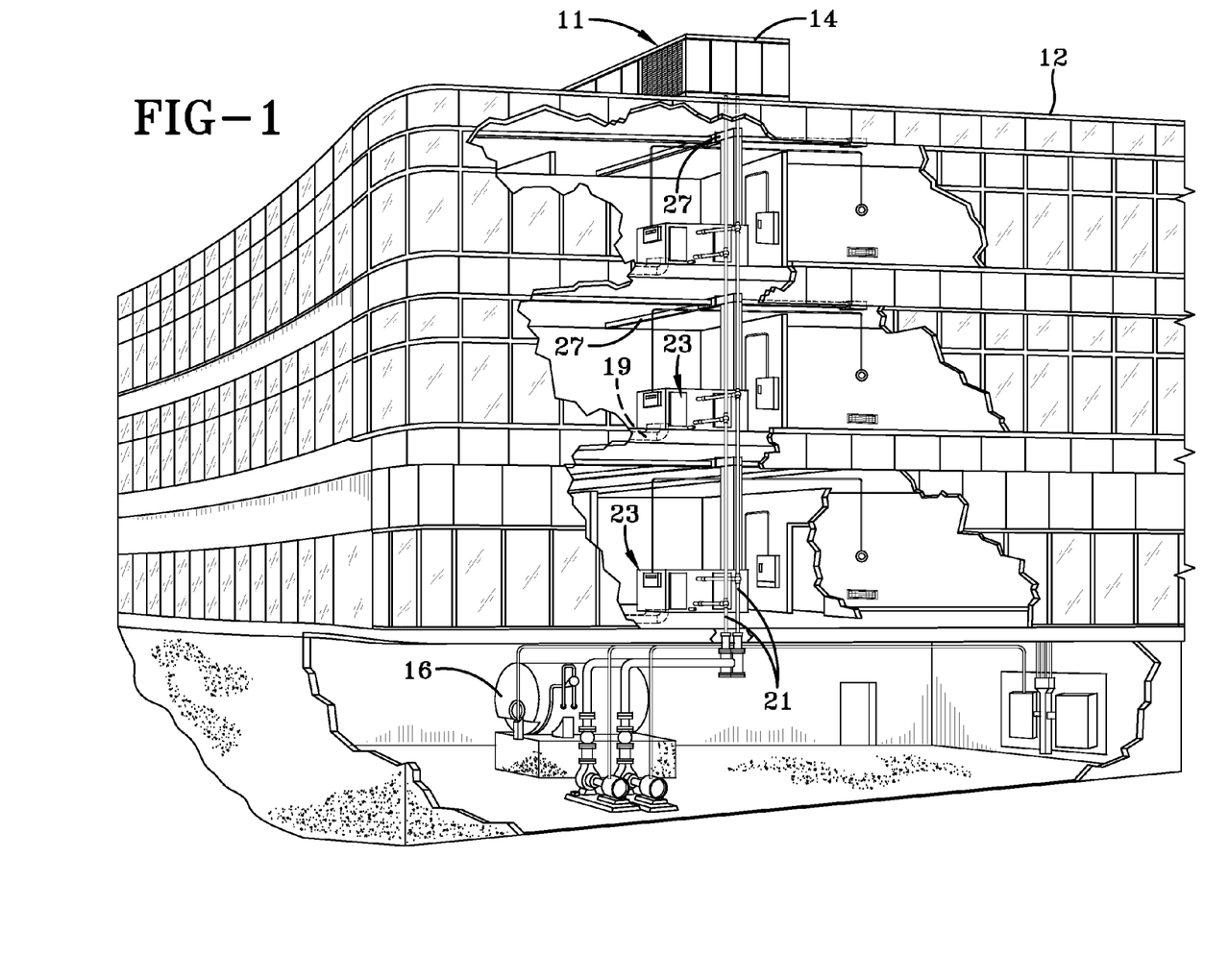
FIG. 1 shows an exemplary embodiment of a Heating, Ventilation, Air Conditioning and Refrigeration (HVAC&R) system in a commercial environment.

FIG. 1 shows an exemplary environment for a Heating, Ventilating, Air Conditioning system (HVAC system) 11 in a building 12 for a commercial setting. HVAC system 11 may include a compressor incorporated into a vapor compression system 14 that can supply a chilled liquid that may be used to cool building 12. HVAC system 11 can also include a boiler 16 used to heat building 12, and an air distribution system that circulates air through building 12. The air distribution system can include an air return duct 19, an air supply duct 27 and an air handler 23. Air handler 23 can include a heat exchanger that is connected to boiler 16 and vapor compression system 14 by conduits 21. The heat exchanger in air handler 23 may receive either heated liquid from boiler 16 or chilled liquid from vapor compression system 14, depending on the mode of operation of HVAC system 11. HVAC system 11 is shown with a separate air handler on each floor of building 12, but it will be appreciated that these components may be shared between or among floors.

Figure 2:
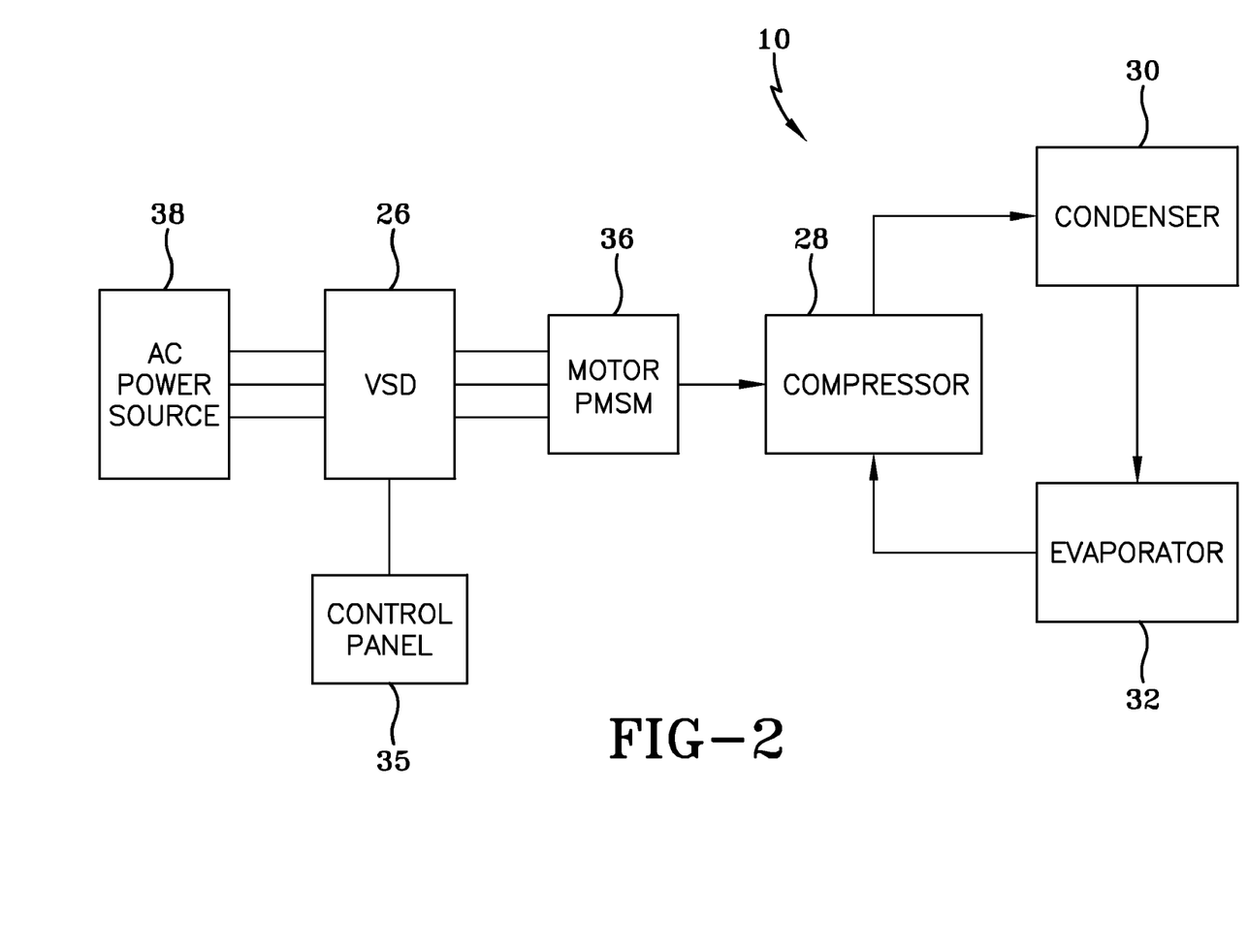
FIG. 2 schematically illustrates an exemplary embodiment of vapor compression system that may be used in the exemplary embodiment of FIG. 1.

FIG. 2 illustrates generally an exemplary configuration of a vapor compression system 14 with a variable speed drive (VSD) 26 that may be used in building 12 in FIG. 1. An AC power source 38 supplies AC power to VSD 26, which in turn, supplies AC power to a motor, for example, PMSM 36. In another embodiment, VSD 26 can power more than one motor. PMSM 36 is used to drive a corresponding compressor 28 of vapor compression system 14. Vapor compression system 14 includes compressor 28, a condenser 30, a water chiller or evaporator 32, and a control panel 35. The compressor 28, condenser 30 and evaporator 32 are connected in a closed refrigerant loop. AC power source 38 provides single phase or multi-phase (e.g., three phase), fixed voltage, and fixed frequency AC power to VSD 26 from an AC power grid or distribution system that is present at a site. AC power source 38 can supply a three phase AC voltage or nominal line voltage of 200 V, 230 V, 380 V, 460 V, or 600 V, at a nominal line frequency of 50 Hz or 60 Hz to VSD 26 depending on the corresponding AC power grid. It is to be understood that AC power source 38 can provide any suitable fixed nominal line voltage or fixed nominal line frequency to VSD 26 depending on the configuration of the AC power grid. In addition, a particular site can have multiple AC power grids that can satisfy different line voltage and line frequency requirements. For example, a site may have a 230 VAC power grid to handle certain applications and a 460 VAC power grid to handle other applications.

VSD 26 receives AC power having a particular fixed line voltage and fixed line frequency from AC power source and provides AC power to PMSM 36 at a desired voltage and desired frequency, both of which can be varied to satisfy particular requirements. VSD 26 may include the ability to provide AC power to the PMSM 36 having higher voltages and frequencies or lower voltages and frequencies than the fixed voltage and fixed frequency received from AC power source 38. PMSM 36 may have a predetermined rated voltage and frequency that is greater than the fixed AC input voltage and frequency, however the rated motor voltage and frequency may also be equal to or lower than the fixed AC input voltage and frequency.

VSD 26 may be, for example, a vector-type drive or a variable-voltage, variable frequency (VVVF) drive. Control panel 35 can include a variety of different components, such as an analog to digital (A/D) converter, a microprocessor, a non-volatile memory, and an interface board, to control operation of system 14. Control panel 35 can also be used to control the operation of VSD 26, and motor 36.

Compressor 28 compresses a refrigerant vapor and delivers the vapor to condenser 30 through a discharge line. Compressor 28 can be, for example, a screw compressor, a centrifugal compressor, a reciprocating compressor, a scroll compressor, or any other suitable type of compressor. The refrigerant vapor delivered by compressor 28 to condenser 30 enters into a heat exchange relationship with a fluid, for example, air or water, and undergoes a phase change to a refrigerant liquid as a result of the heat exchange relationship with the fluid. The condensed liquid refrigerant from condenser 30 flows through an expansion device (not shown) to evaporator 32.

Evaporator 32 may include connections for a supply line and a return line of a cooling load. A process fluid, for example, water, ethylene glycol, calcium chloride brine or sodium chloride brine, travels into evaporator 32 via return line and exits evaporator 32 via supply line. The liquid refrigerant in evaporator 32 enters into a heat exchange relationship with the process fluid to lower the temperature of the process fluid. The refrigerant liquid in evaporator 32 undergoes a phase change to a refrigerant vapor as a result of the heat exchange relationship with the process fluid. The vapor refrigerant in evaporator 32 exits evaporator 32 and returns to compressor 28 by a suction line to complete the cycle.

Figure 3:
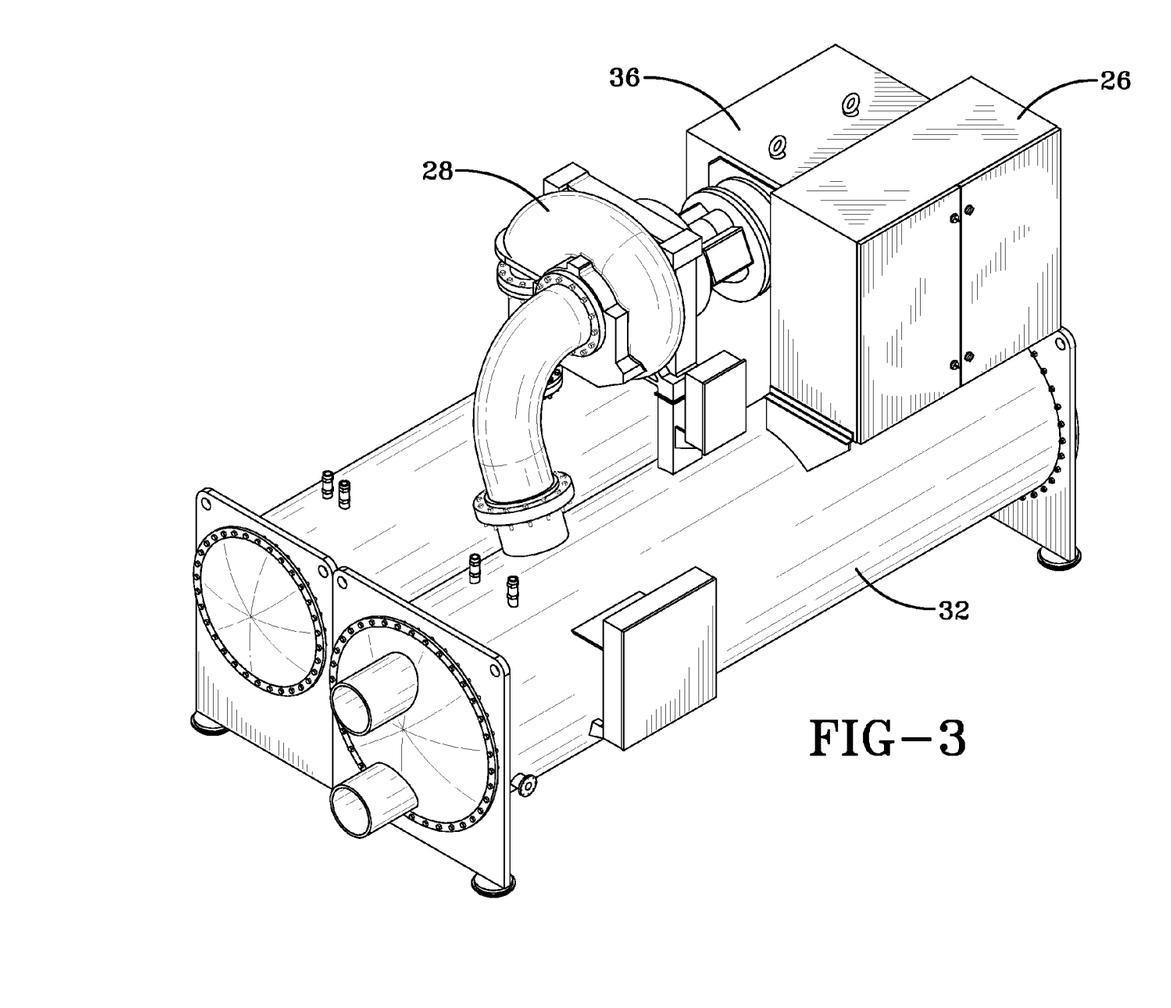
FIG. 3 shows an exemplary embodiment of a variable speed drive (VSD) mounted on a vapor compression system.

FIG. 3 shows an exemplary vapor compression system of an HVAC&R system. The VSD 26 can be mounted on top of the evaporator 32, and adjacent to motor 36. Motor 36 may be mounted on condenser 30 on the opposite side of evaporator 32. Output wiring (not shown) from VSD 26 is connected to motor leads (not shown) for motor 36, to power motor 36, which drives compressor 28.

Figure 4:
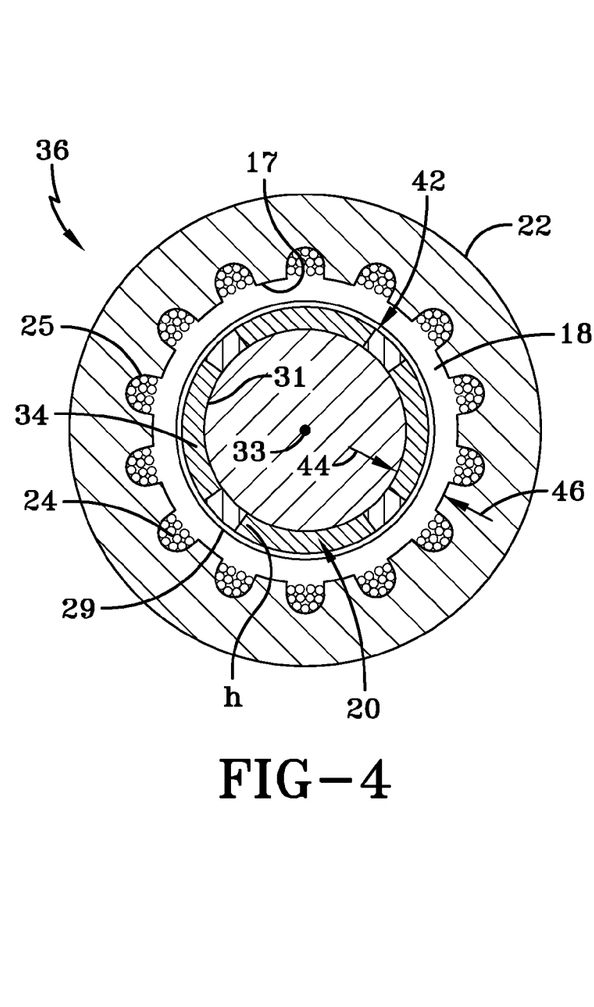
FIG. 4 is an exemplary schematic diagram of a permanent magnet synchronous motor.

Referring to FIG. 4, an exemplary PMSM 36 includes a stator portion 22. The stator portion 22 can be configured substantially similar to a stator of a conventional induction motor. Stator portion 22 includes a plurality of windings 24 disposed in slots 25 defined by a plurality of teeth 17, symmetrically distributed about an inside radius of stator portion 22 adjacent to a rotor portion 20. Rotor portion 20 is disposed axially concentrically with and inside stator portion 22, rotor portion 20 and stator portion 22 separated by an air gap 18. Rotor portion 20 may include a cylindrical steel rotor frame or cage 31 with a plurality of permanent magnets 34 arranged peripherally on rotor cage 31. Permanent magnets 34 produce a magnetic field in air gap 18. Permanent magnets 34 may be arranged to provide multiple pole arrangements, for example 2-pole or 4-pole, in rotor portion 20. Permanent magnets 34 may be adhesively affixed to cage 32, and are enveloped by a sleeve 29 to maintain permanent magnets 34 on cage 31 when centrifugal forces act on rotor portion 20 during rotation of PMSM 36. Sleeve 29 may be constructed of carbon fiber tubular sheet material, stainless steel or other similarly flexible, high strength, magnetically non-permeable material. Air gap 18 is small relative to an effective air gap g shown between opposing arrows 44, 46. Effective air gap g includes the height h of permanent magnets 34 and sleeve 29.

Figure 5:
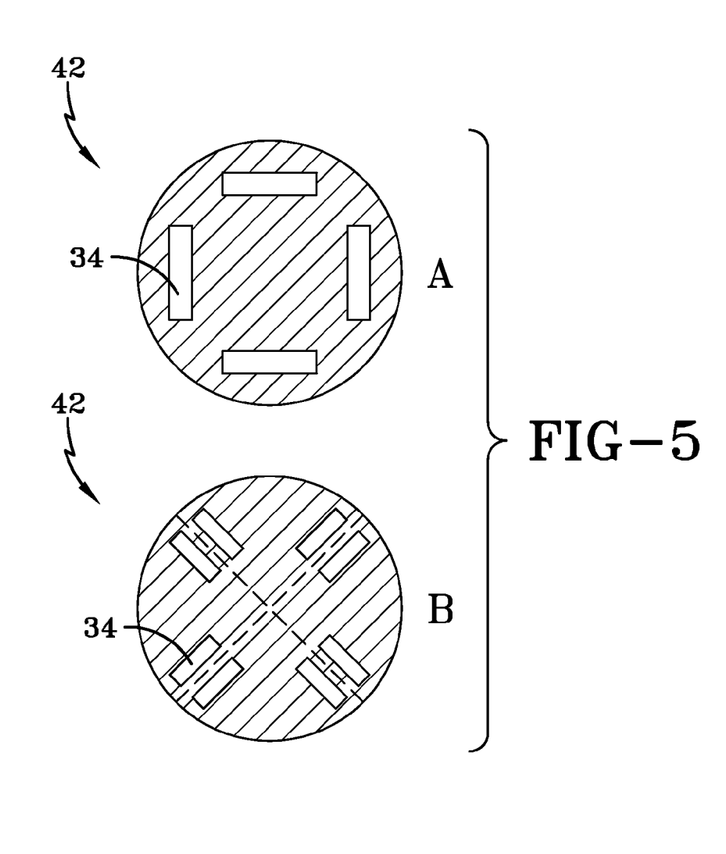
FIG. 5 is an exemplary schematic diagram of the rotor of an internal PMSM (IPM).

In another exemplary embodiment, PMSM 36 may be configured as an internal permanent magnet motor (IPM). FIG. 5 illustrates schematically an exemplary IPM rotor 42. The IPM 42 includes permanent magnets 34 implanted within rotor portion 20, rather than being mounted on the surface of rotor portion 20.

Figure 6:
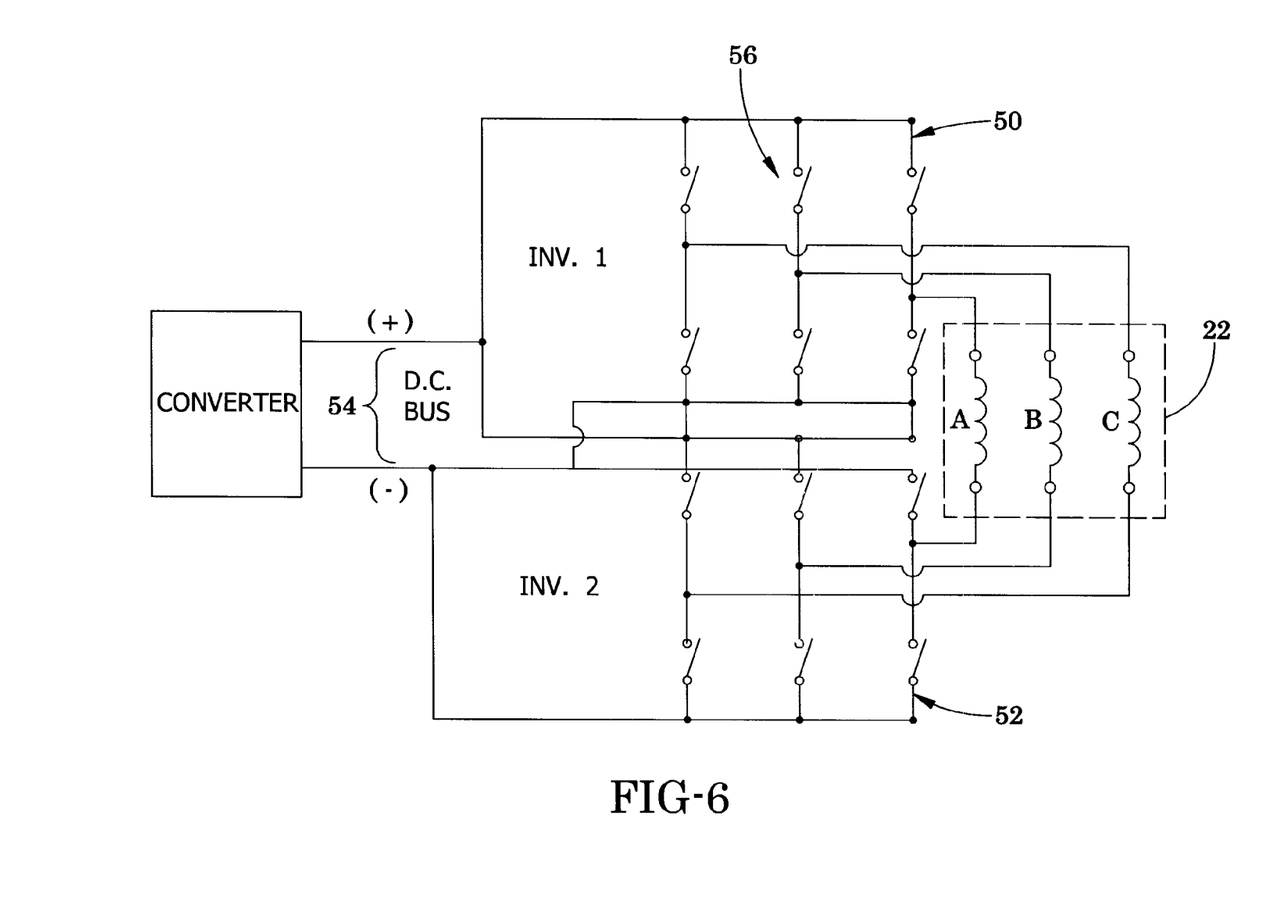
FIG. 6 is a schematic diagram showing parallel inverters powering a PMSM load.

Referring to FIG. 6, VSD 26 may be configured to provide increased power to PMSM 36, by powering PMSM 36 with multiple inverters 50, 52, at the output of VSD 26. Other configurations may include single-phase, two-phase and other multi-phase motors and drives. The input shown at the left hand side (as shown in FIG. 6) of first inverter 50 is connected to a DC bus 54, and the output or right hand side (as shown in FIG. 6) of first inverter 50 is connected to one end of stator windings of PMSM 36, indicated schematically by three stator windings A, B and C. Second inverter 52 is connected to DC bus 54, and is connected to the opposite end of stator windings A, B and C. In other words, stator winding A is connected between a terminal of phase A of inverter 50 and a terminal of phase A of inverter 52; similarly, stator winding B is connected between a terminal of phase B of inverter 50 and a terminal of phase B of inverter 52; and stator winding C is connected between a terminal of phase C of inverter 50 and a terminal of phase C of inverter 52. Inverters 50, 52 can be powered by a common DC-bus power source or the DC bus connected with inverter 50 can be serially connected with the DC bus of inverter 52 so that the output voltage can be further increased. Inverters 50, 52 are synchronously controlled by a common controller for gate switching of switches 56, for example, power transistors. The two-inverter configuration for powering PMSM 36 provides the capability to increase motor voltage and power while maintaining the same current through PMSM 36. The two-inverter configuration may also be applied to conventional single and multi-phase motors to obtain increased power and voltages. As shown in an alternate embodiment in FIG. 7, inverters 50, 52 may be powered by independent DC buses 53, 54 at their respective inputs.

In another aspect, multiple converters can be connected in parallel to increase the output power capability. Multi-level configuration converter topology of VSD may also be applied to reduce the voltage stress on the switching transistors, improve the current/voltage waveforms on VSD output, reduce the harmonics and reduce the Electromagnetic Interference (EMI) caused by switching.

Figure 7:
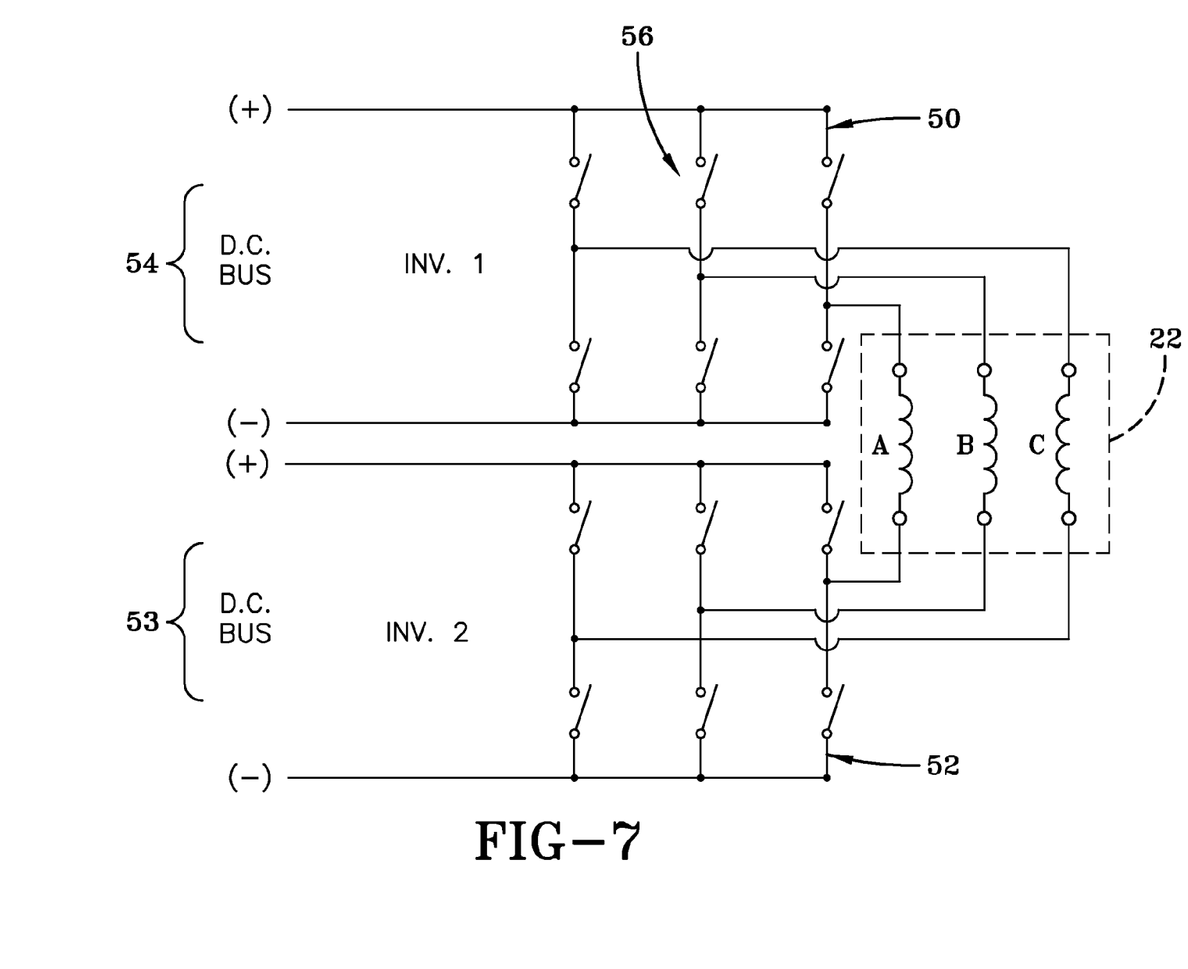
FIG. 7 is a schematic diagram showing independent DC power sources for the parallel inverters powering a PMSM load in another exemplary embodiment.

The multiple inverter configurations of FIGS. 6 & 7 are not limited to a PMSM motor, and other motors, e.g., induction motors or other synchronous motors may be substituted for the PMSM within the scope of the appended claims.

While only certain features and embodiments of the invention have been illustrated and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A drive system for a compressor of a chiller system, the drive system comprising:
a variable speed drive, the variable speed drive being configured to receive an input AC power at a fixed AC input voltage and fixed input frequency and provide an output AC power at a variable voltage and variable frequency, the variable speed drive comprising:
a converter connected to an AC power source providing the input AC voltage, the converter being configured to convert the input AC voltage to a DC voltage;
a DC link connected to the converter, the DC link being configured to filter and store the DC voltage from the converter; and
a first inverter and a second inverter, each of the first inverter and the second inverter connected to the DC link; and
a motor having at least one stator winding, the at least one stator winding connected between an output of the first inverter and an output of the second inverter to power the motor by the output AC power from the first inverter and the second inverter; the at least one stator winding comprising a first terminal connected to the first inverter and a second terminal connected to the second inverter;
the motor being connectable to a compressor of the chiller system to power the compressor.

2. The drive system of claim 1, wherein the motor is a permanent magnet synchronous motor.

3. The drive system of claim 1, wherein the at least one stator winding comprises a first stator winding, a second stator winding and a third stator winding output.

4. The drive system of claim 3, wherein first stator winding is connected between output phase A of first inverter and output phase A of second inverter; second stator winding is connected between output phase B of first inverter and output phase B of second inverter; and third stator winding is connected between output phase C of first inverter and output phase C of second inverter.

5. The drive system of claim 1, wherein the first inverter and second inverter are configured to provide increased motor voltage and power while maintaining the same current through the motor.

6. The drive system of claim 1, wherein the DC link further comprises a first DC bus associated with the first inverter, and a second DC bus associated with the second inverter, the first and second DC buses connected in series.

7. The drive system of claim 6, wherein the first DC bus powers first inverter exclusively, and second DC bus powers second inverter exclusively.

8. The drive system of claim 1, wherein the first inverter and the second inverter are synchronously controlled by a common controller for gate switching of switches.

9. The drive system of claim 1, wherein the motor is a single phase motor or a multi-phase motor.

10. The drive system of claim 1, wherein the converter comprises multiple converters connected in parallel to increase an output power capability.

11. A chiller system comprising:
a compressor, a condenser, and an evaporator connected in a closed refrigerant loop;
a motor connected to the compressor to power the compressor; and
a variable speed drive connected to the motor, the variable speed drive being configured to receive an input AC power at a fixed input AC voltage and a fixed input frequency and provide an output power at a variable voltage and variable frequency to the motor, the variable voltage having a maximum voltage greater in magnitude than the fixed input AC voltage and the variable frequency having a maximum frequency greater than the fixed input frequency, the variable speed drive comprising:
- a converter connected to an AC power source providing the input AC voltage, the converter being configured to convert the input AC voltage to a DC voltage;
- a DC link connected to the converter, the DC link being configured to filter and store the DC voltage from the converter; and
- a first inverter and a second inverter, each of the first inverter and the second inverter connected to the DC link;

the motor having at least one stator winding, the at least one stator winding connected between an output of the first inverter and an output of the second inverter, and the at least one stator winding having a first terminal and a second terminal; the at least one stator winding first terminal connected to the first inverter and the at least one stator winding second terminal connected to the second inverter;

the variable speed drive configured to power the motor by the output AC power from the first inverter and the second inverter.

12. The chiller system of claim 11, wherein the motor is a permanent magnet synchronous motor.

13. The chiller system of claim 11, wherein the motor further comprises stator windings A, B and C, the output of the first inverter connected to stator windings A, B and C and the output of the second inverter connected to stator windings A, B and C, respectively at an end of the respective stator winding opposite the connection of the first inverter output.

14. The chiller system of claim 13, wherein stator winding A is connected between output phase A of first inverter and output phase A of second inverter; stator winding B is connected between output phase B of first inverter and output phase B of second inverter; and stator winding C is connected between output phase C of first inverter and output phase C of second inverter.

15. The chiller system of claim 11, wherein the first inverter and second inverter are configured to provide increased motor voltage and power while maintaining the same current through the motor.

16. The chiller system of claim 11, wherein the DC link further comprises a first DC bus associated with the first inverter, and a second DC bus associated with the second inverter, the first and second DC buses connected in series.

17. The chiller system of claim 16, wherein the first DC bus powers first inverter exclusively, and second DC bus powers second inverter exclusively.

18. The chiller system of claim 11, wherein the first inverter and the second inverter are synchronously controlled by a common controller for gate switching of switches.

19. The chiller system of claim 11, wherein the motor is a single phase motor or a multi-phase motor.

20. The chiller system of claim 11, wherein the converter comprises multiple converters connected in parallel connected to increase an output power capability.

\* \* \* \* \*